United States Patent
Koelbl et al.

(10) Patent No.: US 7,334,833 B2
(45) Date of Patent: Feb. 26, 2008

(54) TAILGATE ASSEMBLY

(75) Inventors: Michael Koelbl, Neuried (DE); Alain Leroy, Diessen a. Ammersee (DE); Dirk Legler, Weil (DE); Thomas Jakimenczuk, Hoehenkirchen (DE); Heinz Pschorn, Dachau (DE); Thomas Rudolph, Hechendorf (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/568,744

(22) PCT Filed: Apr. 26, 2005

(86) PCT No.: PCT/EP2005/004450

§ 371 (c)(1),
(2), (4) Date: Nov. 6, 2006

(87) PCT Pub. No.: WO2005/108192

PCT Pub. Date: Nov. 17, 2005

(65) Prior Publication Data

US 2007/0158973 A1   Jul. 12, 2007

(30) Foreign Application Priority Data

May 6, 2004   (DE) ...................... 10 2004 022 426

(51) Int. Cl.
*B60J 5/02*   (2006.01)
(52) U.S. Cl. .................................................. 296/146.8
(58) Field of Classification Search .................. 296/50, 296/146.8
See application file for complete search history.

(56) References Cited

U.S. PATENT DOCUMENTS 6,007,139 A * 12/1999 Shave ...................... 296/146.8
2002/0121798 A1* 9/2002 Landmesser ............. 296/146.8

FOREIGN PATENT DOCUMENTS

| DE | 19907391 A1 | 8/2000 |
|---|---|---|
| EP | 0970749 A1 | 1/2000 |
| EP | 1170160 A2 | 1/2002 |

* cited by examiner

Primary Examiner—Lori L. Lyjak
(74) Attorney, Agent, or Firm—David S. Safran

(57) ABSTRACT

A rear hatch arrangement of a motor vehicle is proposed which comprises a first, upper rear hatch part (15) which is attached via a coupling means (16) to a body section (11) and can be pivoted around an axis which runs in the transverse direction of the vehicle, and a second, lower rear hatch part (15) with an upper edge which in the closed position borders the lower edge of the upper rear hatch part (14) and which lower rear hatch part can be pivoted out relative to the upper rear hatch part (14) by means of at least one articulated mechanism. As claimed in the invention the articulated mechanism (19) is guided in at least one guide rail (23) so that the lower rear hatch part (15) in the outwardly pivoted state can be translationally shifted relative to the upper rear hatch part (14).

12 Claims, 1 Drawing Sheet

TAILGATE ASSEMBLY

The invention relates to a rear hatch arrangement of a motor vehicle as claimed in the preamble of claim 1.

This rear hatch arrangement is known from EP 0 979 746 B1 and comprises a first, upper rear hatch part which is connected to the body area of the motor vehicle with a capacity to pivot via hinges which are located in the area of the top edge of the hatch so that the upper rear hatch part can be pivoted around an axis which runs in the transverse direction of the vehicle. A second, lower rear hatch part which can be pivoted over the upper rear hatch part when the rear hatch is opened is coupled to the upper rear hatch part via articulated mechanisms which are located on either side on the rear hatch and which each are formed from two connecting rods. Since the connecting rods are coupled in the middle region of the side edges of the lower rear hatch part, they must be made comparatively long so that the lower rear hatch part is pivoted to the outside, taking up space when the rear hatch is opened.

DE 199 07 391 A1 discloses a vehicle rear hatch with a coupling means for pivoting support on a body section of the vehicle. The coupling means in addition to a pivoting process also allows translational motion of the rear hatch in the plane defined by the rear hatch.

Furthermore, EP 1 170 160 A2 discloses the rear hatch of a motor vehicle which consists of an upper and a lower rear hatch part. The upper rear hatch part is coupled in the area of its upper edge to the body section of the motor vehicle, and the lower rear hatch part is coupled in the area of its upper edge to the lower edge of the upper rear hatch part. In the opening process the lower rear hatch part is guided by guide means in side rails formed on the vehicle body. The opening process is supported by means of gas pressure springs. Starting at a certain degree of opening of the rear hatch, the guide mechanisms which are located laterally on the lower rear hatch part emerge from the guide rail.

A two-part rear hatch is also known in which the lower rear hatch part can be folded down and away and projects over the bumper of the vehicle.

The object of the invention is to devise a rear hatch arrangement which is characterized by small space requirement during opening.

The object is achieved as claimed in the invention by a rear hatch arrangement with the features as claimed in claim 1.

The heart of the invention therefore lies in the lower rear hatch part during opening being swiveled on the one hand relative to the upper rear hatch part and on the other being able to be translationally pushed relative to the upper rear hatch part. In this way, the lower rear hatch part can be pushed over or even under the upper hatch part before the rear hatch as a whole is pivoted. By combining the articulated mechanism with the guide rail the articulated mechanism can be made short, so that pivoting of the lower rear hatch part can also take place relative to the upper rear hatch part in a space-saving manner. The rear hatch arrangement as claimed in the invention is therefore characterized in that the amount of space required when opening is greatly reduced compared to a one-piece rear hatch or even to a two-piece rear hatch in which the two rear hatch parts are connected to one another via comparatively long connecting rods.

The rear hatch arrangement as claimed in the invention is made especially such that on the two sides of the rear hatch there is one articulated mechanism at a time via which the upper rear hatch part and the lower rear hatch part are connected to one another and which is guided in one guide rail at a time. The guide rail assigned to the respective articulated mechanism is located especially on the pertinent side on the lower rear hatch part. But it is also conceivable for the guide rail for the articulated mechanisms to be located on the upper rear hatch part or for there to be one guide rail at a time for the articulated mechanism both on the lower and on the upper rear hatch part.

The upper rear hatch part for example forms a frame for a rear window which can be cemented into the frame or as an openable version can also be linked to the frame via hinges.

In one preferred embodiment of the rear hatch arrangement as claimed in the invention, the articulated mechanism is guided via a guide carriage in the guide rail. Thus, neat guidance of the articulated mechanism is ensured.

In an easily executed embodiment of the rear hatch arrangement as claimed in the invention, the articulated mechanism is formed essentially from an arc-shaped hinge. The arc-shaped hinge is then coupled with one end to one of the rear hatch parts, especially the upper rear hatch part, with its other end to the guide carriage which is guided in the guide rail of the other, especially the lower rear hatch part.

Alternatively, the articulated mechanism can however also be formed from a four-bar mechanism or the like so that it has at least two connecting rods which are each coupled by one end to one of the two rear hatch parts and with their other ends are guided especially via the guide carriage in the guide rail. This stable execution of the articulated mechanism ensures especially controlled and reliable pivoting of the lower rear hatch part relative to the upper rear hatch part.

In order to impart to the user the feeling of a defined opening and closing position, the guide rail can be provided with at least one catch means which interacts especially with the guide carriage to which the articulated mechanism is coupled. The guide carriage then locks into the catch means in the open position and/or in the closed position.

Furthermore, it is advantageous if the articulated mechanism also interacts with a catch means. This ensures that the lower rear hatch part, after it has been pivoted out relative to the upper rear hatch part and has been translationally moved, cannot be pivoted back; this could cause damage to the rear hatch arrangement. The catch means releases the articulated mechanism again only when the lower rear hatch or module part has been pushed back relative to the upper rear hatch or module part into its initial position, i.e. into its displacement position which corresponds to the closed position.

To make the rear hatch arrangement as claimed in the invention easy to operate, it can be provided with a displacement means for the lower rear hatch part which at least supports the translational shifting of the lower rear hatch part relative to the upper rear hatch part. For example, the displacement means comprises at least one gas pressure spring and/or one electrical, hydraulic or pneumatic drive.

The complete opening process of the rear hatch can be carried out both mechanically and also automatically driven when rear hatch unlocking is actuated. In the latter case then also the pivoting of the lower rear hatch part relative to the upper rear hatch part can take place by means of a drive.

Other advantages and advantageous configurations of the subject matter as claimed in the invention can be taken from the specification, the drawings and the claims.

One embodiment of the rear hatch arrangement as claimed in the invention is shown schematically simplified in the drawings and is explained in the following description.

Figure 1:
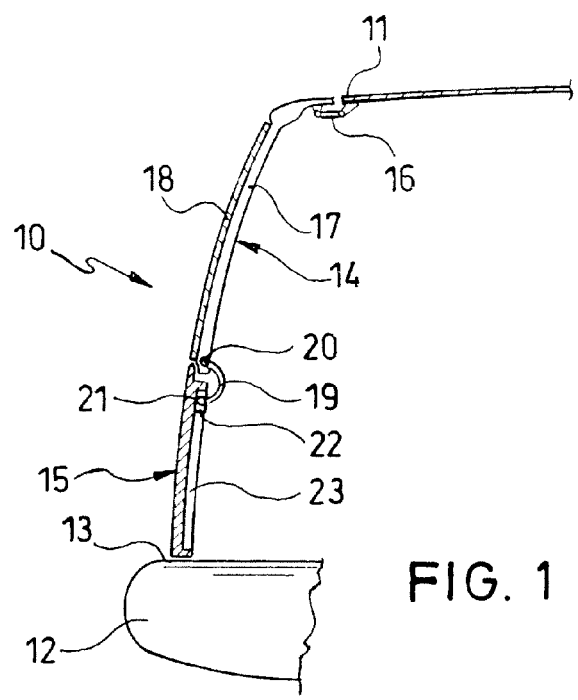
FIG. 1 shows a side view of a rear hatch arrangement made as claimed in the invention in the closed state.

The drawings show a rear hatch 10 which is located in the rear in a motor vehicle which is made as a so-called station wagon, a so-called van or a so-called sports utility vehicle (SUV), and extends from the body region which forms the roof edge 11 as far as a loading edge 13 of a cargo space of the vehicle which is not otherwise detailed, which loading edge 13 is formed in the area of the bumper.

On its lower edge the rear hatch 10 interacts with a rear hatch lock which is not detailed.

The rear hatch 10 encompasses an upper rear hatch part 14 and a lower rear hatch part 15. The upper rear hatch part 14 which is connected via hinges 16 to the body section which forms the roof edge 11 comprises a window frame 17 into which the rear window 18 of the motor vehicle is cemented.

The lower rear hatch part 15 is coupled to the upper rear hatch part 14 via articulated mechanisms 19 which are located on either side on the rear hatch 10 and which are each formed essentially from an outwardly pivoting hinge 19 which is arc-shaped in this case.

In the drawings only the articulated mechanism which is located on the right side of the vehicle and the right side of the rear hatch is shown. The articulated mechanism which is located on the left side of the rear hatch is made mirror symmetrically to the right articulated mechanism and corresponds functionally to the latter. The following description is limited therefore to the articulated mechanism which is shown in the drawings, for the sake of clarity.

The pivoting hinge 19 is connected with its one end via a pin 20 to the upper rear hatch part 14 and with its other end via a pin 21 to the guide carriage 22 which is guided in a guide rail 23 which is made laterally on the lower rear hatch part 15. The pin 20 and the pin 21 each interact with a stop which is not shown to fix a defined, outwardly pivoting position of the lower rear hatch part 15 relative to the upper rear hatch part 14. Furthermore, there is a catch means which acts in the open position and which prevents pivoting of the lower rear hatch part 15 relative to the upper rear hatch part 14 when the lower rear hatch part 15 is pushed relative to the upper rear hatch part 14.

Between the lower rear hatch part 15 and the upper rear hatch part 14 there are furthermore a sealing section and a locking mechanism.

The actuation of the rear hatch 10 which is shown in the drawings takes place in the manner which is detailed below.

Figure 2:
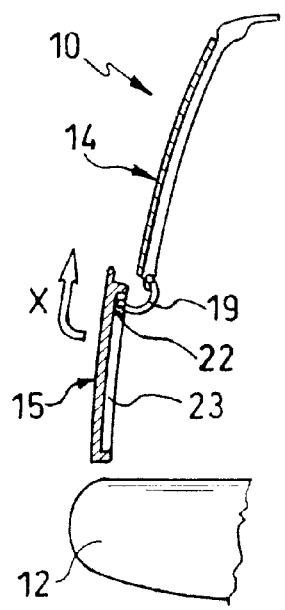
FIG. 2 shows the rear hatch arrangement as shown in FIG. 1 in the first opening phase.
Figure 3:
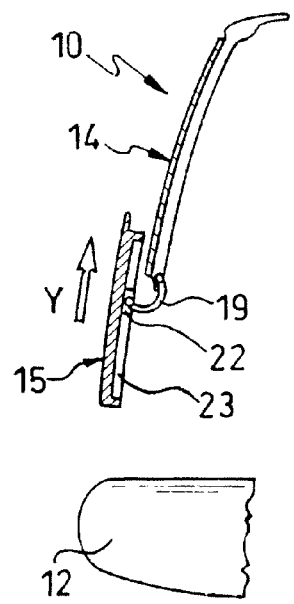
FIG. 3 shows the rear hatch arrangement as shown in FIG. 1 in the second opening phase.
Figure 4:
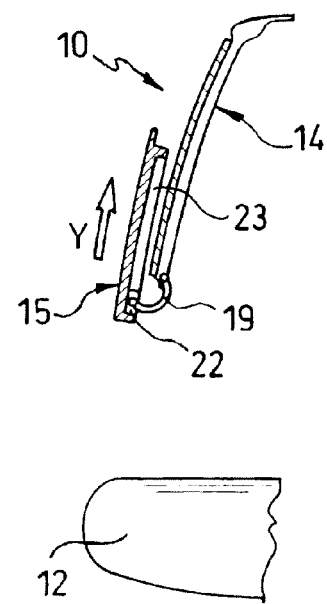
FIG. 4 shows the rear hatch arrangement as shown in FIG. 1 in the third opening phase.

After unlocking the rear hatch lock by means of an unlocking handle which is located on the lower rear hatch part, the lower rear hatch part 15, as shown in FIG. 2, according to the arrow X is pivoted by pressure applied by means of a rear hatch sealing section to the outside until the pins 20 and 21 each interact with their respective stop. The pivoting process is supported or triggered by a sealing pressure applied by means of a rear hatch sealing section. Furthermore, the lower rear hatch part 15 can also be pretensioned with an additional tensioning means in the open direction. Then the lower rear hatch part 15 according to an arrow Y is pushed up, the guide carriage 22 sliding in the guide rail 23, as is shown using FIG. 3. The movement of the lower rear hatch part 15 is supported by means of the gas pressure spring. The lower rear hatch part 15 is pushed according to the arrow Y until the guide carriage 22 locks into a catch formed in the guide rail 23. The catch position defines the position of the lower rear hatch part 15 in which the package consisting of the upper rear hatch part 14 and the lower rear hatch part 15 can be swiveled up in the conventional manner. The rear hatch 10 is therefore pivoted up as a whole with the lower rear hatch part 15 which is pushed over the upper rear hatch part 14. The rear hatch 10 is closed in the reverse manner.

REFERENCE NUMBERS 10 rear hatch
11 roof edge
12 bumper
13 loading edge
14 upper rear hatch part
15 lower rear hatch part
16 hinge
17 window frame
18 rear window
19 outwardly pivoting hinge
20 pin
21 pin
22 guide carriage
23 guide rail

The invention claimed is:

1. Rear hatch arrangement of a motor vehicle, comprising a first, upper rear hatch part (14) which is attached via a coupling means (16) to a body section (11) and can be pivoted around an axis which runs in the transverse direction of the vehicle, and a second, lower rear hatch part (15) with an upper edge which in the closed position borders the lower edge of the upper rear hatch part (14) and which lower rear hatch part can be pivoted out relative to the upper rear hatch part (15) by means of at least one articulated mechanism, characterized in that the articulated mechanism (19) is guided in at least one guide rail (23) so that the lower rear hatch part (15) in the outwardly pivoted state can be translationally shifted relative to the upper rear hatch part (14).

2. Rear hatch arrangement as claimed in claim 1, wherein the articulated mechanism is guided via a guide carriage (22) in the guide rail (23).

3. Rear hatch arrangement as claimed in claim 1, wherein the guide rail (23) is located on the lower rear hatch part (15).

4. Rear hatch arrangement as claimed in claim 1, wherein the articulated mechanism is formed from an arc-shaped hinge (19).

5. Rear hatch arrangement as claimed in claim 1, wherein the articulated mechanism is formed from a four-bar mechanism.

6. Rear hatch arrangement as claimed in claim 1, wherein the guide rail (23) is provided with at least one catch means.

7. Rear hatch arrangement as claimed in claim 1, wherein the articulated mechanism interacts with a catch device.

8. Rear hatch arrangement as claimed in claim 1, characterized by a displacement means for the lower rear hatch part (15) which at least supports the translational shifting of the lower rear hatch part (15) relative to the upper rear hatch part (14).

9. Rear hatch arrangement as claimed in claim 8, wherein the displacement means comprises at least one gas pressure spring.

10. Rear hatch arrangement as claimed in claim 8, wherein the displacement means comprises an electrical, hydraulic or pneumatic drive.

11. Rear hatch arrangement as claimed in claim 2, wherein the guide rail (23) is located on the lower rear hatch part (15).

12. Rear hatch arrangement as claimed in claim 9, wherein the displacement means comprises an electrical, hydraulic or pneumatic drive.

* * * * *